(No Model.)
M. A. ROSO.
COMBINED ADJUSTABLE HANDLE BAR AND BRAKE FOR BICYCLES.
No. 575,936. Patented Jan. 26, 1897.
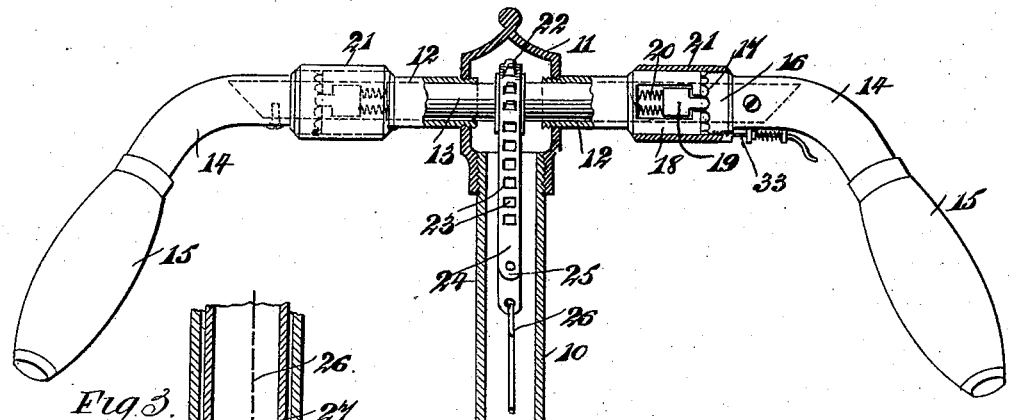
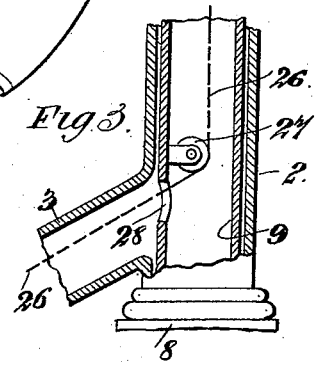
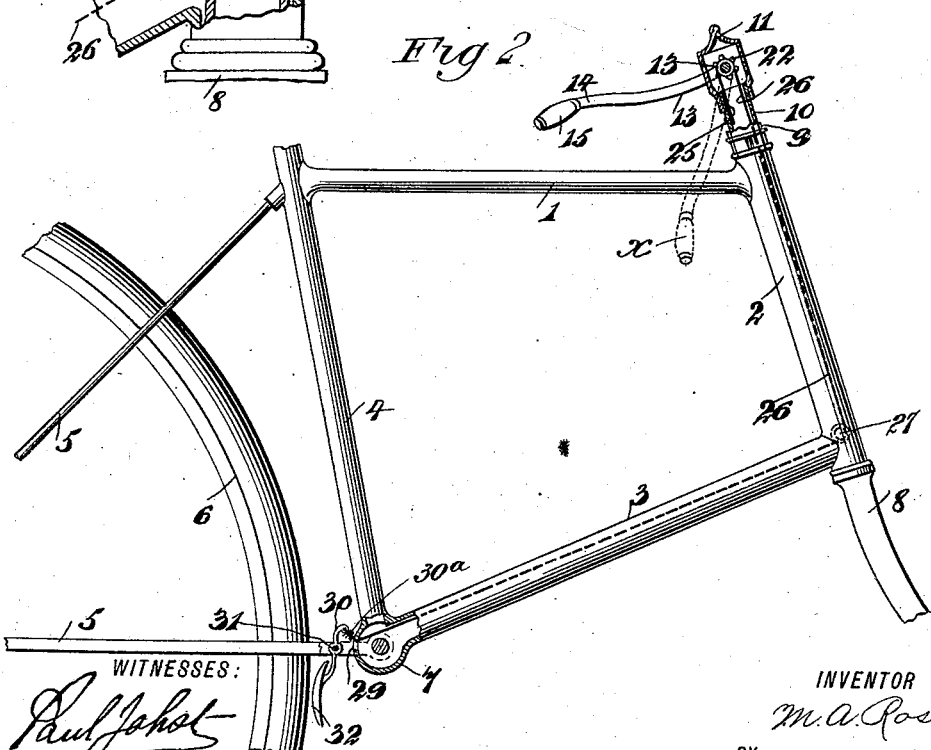
WITNESSES:
INVENTOR
M. A. Roso.
BY
ATTORNEYS.

UNITED STATES PATENT OFFICE.

MANUEL A. ROSO, OF NEW YORK, N. Y.

COMBINED ADJUSTABLE HANDLE-BAR AND BRAKE FOR BICYCLES.

SPECIFICATION forming part of Letters Patent No. 575,936, dated January 26, 1897.

Application filed January 24, 1896. Serial No. 576,710. (No model.)

*To all whom it may concern:*

Be it known that I, MANUEL A. ROSO, of New York city, in the county and State of New York, have invented a new and Improved Combined Adjustable Handle-Bar and Brake for Bicycles, of which the following is a full, clear, and exact description.

This invention relates to certain improvements in the handle-bars of bicycles and similar vehicles, and has for its object to provide a handle-bar of a simple and inexpensive construction which shall be strong and light and shall at the same time be capable of adjustment so that its end portions may be made to stand in any desired position, the handle-bar being combined with a brake device arranged to be operated by the movement of said handle-bar, so that the wheel may be readily stopped merely by moving the handle.

The invention consists in a handle-bar comprising a stem or upright portion adapted to be clamped to the steering-post, a horizontal portion mounted to turn in the upper end of said stem and having its opposite ends provided with grips, means for holding the horizontal portion of the handle-bar normally against rotative movement, and a brake device actuated by said horizontal portion when turned.

The invention also contemplates certain novel features in the construction, combination, and arrangement of the various parts of the improved device, whereby the combined handle-bar and brake is made simpler, cheaper, and otherwise better adapted and more convenient for use than various other similar devices heretofore employed, as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1 is a view showing a handle-bar constructed in accordance with my invention, the stem thereof being shown in axial section. Fig. 2 is a fragmentary side view of a bicycle, showing my improved device applied thereto, the stem of the handle-bar being shown in section; and Fig. 3 is a fragmentary detail view drawn to an enlarged scale and showing the location of the opening at the lower end of the steering-post through which the brake strap or wire passes.

The frame of the bicycle is, as shown in Fig. 2, of the ordinary diamond pattern, being constructed with a horizontal top brace 1, a head-bearing 2, a diagonal lower brace 3, and a rear brace 4, these parts being made of large tubing in the ordinary way, and 5 5 indicate the rear forks of the bicycle-frame, wherein is journaled the driving-wheel 6 in the ordinary way. At the junction between the rear bars and the diagonal lower brace 3 is arranged a crank-shaft bearing 7, and the steering-wheel will be carried in the front forks 8, which are connected to the lower end of the steering-post 9, extending up inside the head-bearing 2, as clearly shown in Fig. 3.

10 indicates the stem or upright portion of the handle-bar, which is clamped at its lower end and adjustably held in the upper end of the steering-post 9 in the ordinary way, and at its upper end said stem 10 is fixed to a hollow casing or head 11, apertured at its opposite sides to receive the screw-threaded ends of horizontal arms 12 of metal tubing, alined with each other and having their outer ends open. In the arms 12 is journaled a horizontal bar or tube 13, which extends across the space or hollow of the casing 11 between the ends of the arms 12, and has its opposite ends projected beyond the opposite outer ends of said arms and adapted to receive handles 14, which may be bent or curved in any desired way, said handles being provided with the usual cork grips 15.

On the ends of the handles 14, adjacent to the outer ends of the arms 12, are mounted fixed collars or flanges 16, encircling the ends of said handles 14 and provided on their edges adjacent to the outer ends of the arms 12 with series of serrations 17 of scalloped form adapted to be engaged by bolts 19, mounted to play longitudinally in recesses formed in collars 18, fixed on the outer ends of the arms 12, as clearly seen in Fig. 1, said bolts 19 being normally held pressed into engagement with said serrations 17 by means of springs 20, located in the recesses behind the bolts. As shown in the drawings, the collars 18 and 16 are of equal diameter, and are housed or covered by sleeves 21, extending around them and serving to hold the bolts and springs in place, said sleeves being secured to either of the collars 16 or 18.

When the handles 14 are turned, each of the serrations 17, being of curved form, slip past the rounded end of the bolt 19, compressing the spring 20 to force the bolt into the next serration, said bolt acting as a latch only by the pressure of its spring and not being adapted to lock the handles against turning.

Within the hollow of the casing or head 11 of the handle-bar is fixed on the horizontal tube or bar 13 a gear-wheel 22, herein shown as formed similarly to a sprocket-wheel and having its teeth adapted to engage openings 23 in a metal band 24, one end 25 of which is adapted to be secured to the inner side of the stem 10 of the handle-bar, while the other end is connected to a wire or strap 26, which extends down through the hollow of the stem 10 of the handle-bar and also through the hollow of the steering-post 9, as indicated in Fig. 3, and is passed at its lower end through an opening 28 in the rear side of said steering-post, the said strap or wire 26 being guided, as clearly seen in Figs. 2 and 3, by a roller or sheave 27, journaled in the hollow of the steering-post 9 adjacent to the opening 28.

The opening 28 in the rear side of the steering-post 9 is arranged opposite to the joint between the head-bearing 2 of the frame and the diagonal lower brace 3 thereof, and the strap or wire 26 after passing through said opening 28 traverses the hollow of the diagonal lower brace 3 of the frame and is carried through the crank-box 7 at the lower end of the brace, being passed through an aperture 29 in the rear wall of said crank-box and connected to the upper end of a brake-lever 30, fulcrumed, as indicated at 31, on the brace or tie connecting the lower forks 5 and carrying at its lower end a brake-shoe 32, adapted to engage the tire of the driving-wheel when the said lever is swung pivotally. The lever 30 is provided with a spring 30ª, holding a shoe 32 normally out of engagement with the wheel-tire.

In operation the handles 14 will be secured to the horizontal tube or bar 13 in such a position that when the brake-shoe 32 is out of engagement with the tire of the driving-wheel the handles will stand in the desired position, and said handles will be held in position normally by the engagement of the bolts 19 with the serrations 17 in the collars 16, as above described. A spring-dog 33, carried on the handle 14 and engaging a recess in the collar 21, which is secured to the arm 12 of the handle-bar, serves to lock said handle to the arm 12 when the brake is not desired for use. When it is desired to apply the brake, it is only necessary, the spring-catch 33 having been disengaged from the collar or sleeve 21, to press down the handles 14, as indicated at x in dotted lines in Fig. 2, whereby the tube or bar 13 is turned in its bearings in the arms 12, so as to draw upward upon the strap or wire 26, whereby the brake-lever 30 will be swung pivotally, and the brake-shoe 32, carried thereon, will be forced into engagement with the tire of the driving-wheel, so as to retard the turning of said wheel.

From the above description it will be seen that the device is of an extremely simple and inexpensive nature and permits the handles 14 to be conveniently adjusted so as to stand either in a raised or lowered position, and it will also be seen that the brake device being combined with said handle permits the brake to be used to stop the wheel by simply pressing downward upon the handle and without requiring the operation of any extraneous levers or other mechanisms.

It will also be obvious from the description of the invention that the device is susceptible of considerable modification without material departure from the principles and spirit of the invention, and for this reason I do not wish to be understood as limiting myself to the precise form and arrangement of the parts herein set forth.

Having thus described my invention, I claim as new and desire to secure by Letters Patent—

1. The combination of a handle-bar having a tubular stem, a casing at the upper end of the stem, tubular arms projecting from opposite sides of the casing, a bar mounted to turn in the tubular arms and having its ends projecting beyond the outer ends of the said arms, handles on the ends of the said bar, fixed serrated collars at the inner ends of said handles, spring-pressed bolts carried by the said arms and normally engaging the serrations on the collars, sleeves serving to hold the said spring-pressed bolts in place, a brake-lever having a shoe to engage the wheel-tire, and means for actuating the lever by the turning of the said bar, substantially as set forth.

2. The combination of a handle-bar having a tubular stem, a casing at the upper end of the stem, arms projecting from opposite sides of the casing, a bar journaled in the arms, handles secured to opposite ends of the bar, serrated collars secured on the handles, recessed collars secured on the ends of the arms opposite the serrated collars, bolts in the recesses of the collars on the arms, springs arranged to hold the said bolts normally engaged with the serrations of the collars on the handles, sleeves inclosing the collars on the arms and handles, a brake-lever having a shoe to engage the wheel-tire, and means to actuate the brake-lever by the turning of the bar, substantially as set forth.

3. The combination of a handle-bar having a tubular stem and arms projecting from its opposite sides, a bar mounted to turn in the arms and provided with handles at its ends, collars secured on the ends of the bar and provided with rounded serrations, bolts carried on the arms and having rounded ends to engage the serrations of the collars, springs to hold the rounded ends of the bolts in engagement with the serrations of the collars, sleeves encircling the bolts and collars, and a brake device actuated by the turning of the bar, substantially as set forth.

4. The combination of a handle-bar having a tubular stem and arms projecting from its opposite sides, a bar mounted to turn in the arms, handles secured to opposite ends of the bar, serrated collars secured on the handles and having rounded serrations 17, bolts carried on the arms and having rounded ends to engage the rounded serrations of the collars, springs to hold the bolts engaged with the serrations of the collars, sleeves encircling the bolts and collars, and a spring-catch carried on one handle and normally engaging one of the sleeves, substantially as set forth.

5. The combination of a frame having a hollow head portion and a lower brace-bar, and provided with a crank-box and rear forks, a tie connecting the rear forks, a steering-post mounted in the head-bearing and having an aperture alined with the joint between the head-bearing and the lower brace-bar of the frame, a handle-bar having a horizontal rotative part carrying a gear-wheel and provided with a stem secured to the steering-post, a brake-lever pivoted on the brace, connecting the rear forks of the frame and provided with a shoe to engage the tire of the driving-wheel, and a strap connected with the brake-lever and provided with openings adapted to be engaged by the teeth of the gear-wheel on the rotative part of the handle-bar the said strap extending down through the hollow of the handle-bar stem, the steering-post, and the lower brace-bar and the crank-box of the frame, substantially as set forth.

MANUEL A. ROSO.

Witnesses:
JNO. M. RITTER,
F. W. HANAFORD.